United States Patent
Matulik

(10) Patent No.: US 8,468,281 B2
(45) Date of Patent: Jun. 18, 2013

(54) APPARATUS TO IMPROVE BANDWIDTH FOR CIRCUITS HAVING MULTIPLE MEMORY CONTROLLERS

(75) Inventor: Eric Matulik, Meyreuil (FR)

(73) Assignee: Atmel Corporation, San Jose, CA (US)

( * ) Notice: Subject to any disclaimer, the term of this patent is extended or adjusted under 35 U.S.C. 154(b) by 267 days.

(21) Appl. No.: 12/433,859

(22) Filed: Apr. 30, 2009

(65) Prior Publication Data

US 2009/0216926 A1    Aug. 27, 2009

Related U.S. Application Data

(63) Continuation of application No. 11/183,052, filed on Jul. 15, 2005, now abandoned.

(30) Foreign Application Priority Data

Apr. 15, 2005    (FR) ...................................... 05 03811

(51) Int. Cl.
 *G06F 13/00* (2006.01)
(52) U.S. Cl.
 USPC ........................................................ 710/107
(58) Field of Classification Search
 USPC ........................................................ 710/107
 See application file for complete search history.

(56) References Cited

U.S. PATENT DOCUMENTS

| | | | |
|---|---|---|---|
| 5,191,649 A | 3/1993 | Cadambi et al. | |
| 5,379,394 A | 1/1995 | Goto | |
| 5,511,154 A * | 4/1996 | Johnson et al. | 345/532 |
| 5,732,278 A * | 3/1998 | Furber et al. | 712/41 |
| 5,893,158 A | 4/1999 | Furuta | |
| 6,078,983 A | 6/2000 | Hanawa et al. | |
| 6,205,536 B1 | 3/2001 | Yoshida | |
| 6,304,931 B1 | 10/2001 | Ono | |
| 6,321,284 B1 * | 11/2001 | Shinohara et al. | 710/113 |
| 6,477,596 B2 | 11/2002 | Miura et al. | |
| 6,513,094 B1 * | 1/2003 | Magro | 711/103 |
| 6,684,268 B1 * | 1/2004 | Paluzzi | 710/33 |
| 6,708,257 B2 | 3/2004 | Bao | |
| 6,907,514 B2 | 6/2005 | Mitsuishi | |

(Continued)

OTHER PUBLICATIONS

"U.S. Appl. No. 11/183,052, Advisory Action mailed Dec. 19, 2007", 3 pgs.

(Continued)

*Primary Examiner* — Nimesh G Patel

(57) ABSTRACT

An apparatus for improving bandwidth for circuits having a plurality of memory controllers employing a first memory controller, a second memory controller, a first busy read output signal circuit, a first busy write output signal circuit, a second busy read output signal circuit, and a second busy write output signal circuit. The first busy read output signal indicates when the first memory controller releases the address bus for a next external access subsequent to a read access to the data bus by the first memory controller. The first busy write output signal indicates when the first memory controller releases the data bus for a next external access subsequent to a write access to the data bus by the first memory controller. The second busy read output signal indicates when the second memory controller releases the address bus for a next external access subsequent to a read access to the data bus by the second memory controller. The second busy write output signal indicates when the second memory controller releases the data bus for a next external access subsequent to a write access to the data bus by the second memory controller.

12 Claims, 8 Drawing Sheets

U.S. PATENT DOCUMENTS

2001/0052060 A1  12/2001  Bao
2002/0029309 A1   3/2002  Lee
2006/0075145 A1*  4/2006  Mueller ........................... 710/3
2006/0236007 A1  10/2006  Matulik
2007/0028021 A1*  2/2007  Gaskins ....................... 710/107

OTHER PUBLICATIONS

"U.S. Appl. No. 11/183,052, Non-Final Office Action mailed Jul. 28, 2006", 5 pgs.

"U.S. Appl. No. 11/183,052, Amendment and Response filed Jul. 6, 2007 to Non-Final Office Action mailed Apr. 6, 2007", 32 pgs.

"U.S. Appl. No. 11/183,052, Applicant's Appeal Brief filed Feb. 4, 2008", 28 pgs.

"U.S. Appl. No. 11/183,052, Final Office Action mailed Oct. 2, 2007", 9 pgs.

"U.S. Appl. No. 11/183,052, Final Office Action mailed Oct. 31, 2008", 10 pgs.

"U.S. Appl. No. 11/183,052, Non-Final Office Action mailed Apr. 6, 2007", 9 pgs.

"U.S. Appl. No. 11/183,052, Non-Final Office Action mailed Apr. 17, 2008", 11 pgs.

"U.S. Appl. No. 11/183,052, Pre-Appeal Brief Request for Review mailed Jan. 30, 2009", 5 pgs.

"U.S. Appl. No. 11/183,052, Amendment and Response filed Jan. 18, 2007 to Notice of Non-Compliant Amendment mailed Jan. 12, 2007", 18 pgs.

"U.S. Appl. No. 11/183,052, Response filed Jul. 17, 2008 to Non-Final Office Action mailed Apr. 17, 2008", 13 pgs.

"U.S. Appl. No. 11/183,052, Amendment and Response filed Oct. 25, 2006 to Non-Final Office Action mailed Jul. 28, 2006", 20 pgs.

"U.S. Appl. No. 11/183,052, Response filed Dec. 3, 2007 to Final Office Action mailed Oct. 2, 2007", 9 pgs.

"U.S. Appl. No. 11/183,052, Decision on Appeal Brief mailed Feb. 26, 2009", 2 pgs.

"Chinese Application Serial No. 200680012371.5, Voluntary Amendments filed Aug. 6, 2008", (w/ English Translation of Amendments), 9 pgs.

"Chinese Application Serial No. 200680012371.5, First Office Action mailed Nov. 14, 2008", (w/ English Translation), 19 pgs.

"Chinese Application Serial No. 200680012371.5, Second Office Action mailed Jun. 19, 2009", (w/ English Translation), 12 pgs.

"International Patent Application Serial No. PCT/US06/08447, International Preliminary Report on Patentability mailed Apr. 27, 2007", 10 pgs.

"International Patent Application Serial No. PCT/US06/08447, International Search Report mailed Aug. 23, 2006", 1 pg.

"International Patent Application Serial No. PCT/US06/08447, Written Opinion mailed Aug. 23, 2006", 3 pgs.

"United Kingdom Application Serial No. 0721911.6, Examination Report mailed on Jul. 1, 2009", 1 pg.

"United Kingdom Application Serial No. 0721911.6, Examination Report mailed Oct. 10, 2008", 3 pgs.

"United Kingdom Application Serial No. 0721911.6, Response filed Apr. 10, 2008 to Examination Report mailed Oct. 10, 2008", 16 pgs.

"Chinese Application Serial No. 200680012371.5, Office Action (with English translation) mailed Sep. 25, 2009", 7 pgs.

* cited by examiner

APPARATUS TO IMPROVE BANDWIDTH FOR CIRCUITS HAVING MULTIPLE MEMORY CONTROLLERS

RELATED APPLICATIONS

This application is a continuation of U.S. patent application Ser. No. 11/183,052, filed on Jul. 15, 2005 now abandoned, which claims the benefit of priority to French Application No. 0503811, filed on Apr. 15, 2005. These applications are incorporated herein by reference in their entirety.

TECHNICAL FIELD

The present invention relates to memory controllers. More specifically, the present invention relates to control circuits for multiple memory controllers.

BACKGROUND ART

An integrated micro-controller device includes a microprocessor, on-chip memories, an interface with external memories including an external bus interface (EBI) used to run application software, a number of standard peripheral modules configured to communicate with the external devices such as an universal asynchronous receiver/transmitter (UART), a serial peripheral interface (SPI), a parallel I/O chip (PIO), or a universal serial bus (USB), and modules to generate interruptions like an interrupt controller, or a timer.

The EBI generates signals required to drive external memories such as a static RAM (SRAM) memory controller; a flash memory controller; a burst flash memory controller; a synchronous dynamic RAM (SD-SDRAM) memory controller; a double date rate synchronous memory controller (DDR-SDRAM); a reduced latency dynamic RAM memory controller, an EEPROM, or a read only memory (ROM). Typically, these signals, like chip select signals, and/or control signals (read/write, enable, strobe) are transmitted using a control bus, an address bus, and/or a data bus. In some types of applications, a micro-controller utilizes an external bus interface (EBI). If this is the case, an EBI may drive several memory devices of different types, like SDRAM, SRAM, and flash, at the same time by generating the corresponding signals for each memory it targets.

The EBI module is often connected on the internal system bus as a slave executing the actions required by the microprocessor which acts as a master in a simplified architecture. The master is able to read/write data from/into the internal memory (RAM) or external memories. Internal memories are often faster than external memory but smaller. Usually, a set of data that requires fast access time (such as interrupt handler software, or any set of data which size is small enough) resides at on-chip memories. When a master sets the internal address bus to a value targeting an on-chip memory (for example, a SRAM), the address decoder asserts the internal selection signal. The EBI is not selected in this case. On the other hand, a large set of data that can be processed at a slower access time, resides at the external memory. When the master starts an access to/from an external memory, the address decoder asserts the internal selection signal. The EBI modules translate the system bus waveforms protocol into the targeted memory waveform protocol.

In this type of prior art architecture, when an external memory requires more than one system bus clock cycle to be accessed, the EBI asserts the "wait" signal to indicate the master that no other access is possible. As a result, the master postpones its next access whatever the destination of the new access is. For example, if the next access target is the external memory, it will postponed because of the wait state which has been asserted to prevent an access to the external bus.

This architecture becomes especially burdensome when several masters are connected on a single system bus to a plurality of slave devices because all of the masters will be put in wait states. In another multiple system bus architecture, where there is a single master per system bus, the master, having initiated the transfer of data, will not be allowed to process any transfer of data to or from other slaves.

FIG. 1 depicts a prior art system architecture 10 with a micro-controller 12 connected to different types of external memories, such as a static RAM (SRAM) memory 14 and a synchronous dynamic RAM (SDRAM) memory by utilizing an external bus interface (EBI) (not shown). If this is the case, the EBI may drive several memory devices of different types, like SRAM 14 and SDRAM 16 by generating the corresponding signals for each memory it targets.

A common port mapping for the EBI includes a single address bus 18, a bi-directional data bus and different control signals. The "chip selects" signals are unique for each memory device. For instance, the chipsel_sram signal 22 is used to select the SRAM memory device 14, whereas the chipsel_sdram signal 24 is utilized to select the SDRAM memory device 16. Each type of memory device requires other specific control signals, like a byte enable signal (not shown) for SRAM 14, and a bank addressing signal (not shown) for SDRAM 16. As it is well known to those skillful in the art, the data transfer cannot occur at the same time on more than one external memory device. Therefore, each control signal output of the micro-controller should have multiple functions to accommodate the needs of different memory devices.

FIG. 2 illustrates a basic prior art micro-controller architecture 40 in more details. The EBI module 42 is often connected on the internal system bus (including an internal address bus 46, an internal data bus 50, an internal read data bus 48, and an internal write data bus 44) as a slave, that is EBI executes the actions required by the microprocessor 52 which acts as a master in a simplified architecture.

In this master-slave model, the master (microprocessor 52) is able to read/write data from/into the internal memory, like ROM, or SRAM on-chip memories 54, or to read/write data from/to the External memories (not shown). An internal memory is in most cases faster than an external memory, but has a lesser data capacity. Therefore, the data that requires a fast access time, such as an interrupt handler software, or any data which size is small enough, is targeted into on-chip memories.

When the master (microprocessor 52) sets the internal address bus 46 to a value targeting an on-chip memory 54 (for example, the SRAM memory), the address decoder 56 asserts the internal "sel_intram" internal selection signal 58. The EBI 42 is not selected in this case.

On the other hand, a large set of data that accepts a slower access time can be stored in the external memory. If this is the case, when the master (microprocessor 52) starts an access to/from an external memory, the address decoder 56 asserts the internal "sel_ebi" selection signal 60 via the EBI module 42 that translates the system bus waveforms protocol into the targeted external memory waveform protocol. When an external memory (not shown) requires more than one system bus clock cycle to be accessed, the EBI 42 asserts the "wait" signal (not shown) to indicate the master (microprocessor 52) that no other access to any kind of destination device is possible. If this is the case, the master (microprocessor 52) postpones its next access to any other device.

Thus, in this prior art system bus architecture where a single system bus is allocated for the master, the master that initiated the transfer to any type of device that requires more than one system bus clock cycle to be accessed will not be allowed to process any transfer to any other device until the first transfer is completed.

This situation is exacerbated in the prior art multiple system bus architecture where several masters are connected via a single system bus to several slaves because all the masters will be put in wait states even if a single master has initiated the transfer to any type of device that requires more than one system bus clock cycle to be accessed.

FIG. 3 illustrates a prior art architecture 70 wherein the EBI has several sub-modules, including a SRAM memory controller 72, and a SDRAM memory controller 74. The "Sel_ebi" signal 60 of FIG. 2 includes a plurality of selection signals, whereas each memory controller is assigned its own selection signal. For instance, the SDRAM memory controller 74 is assigned the selection signal "sel_extsdram" 78, and the SRAM memory controller 72 is assigned the selection signal "sel_extsram" 76. The multiplexers MUX1 80 and MUX2 82 are required to share the external address bus 84 and the external data bus 86. If the SRAM memory (not shown) is selected, the "external address bus" 84 is driven by the SRAM controller 72. The multiplexer MUX3 88 allows the SRAM memory controller 72 and the SDRAM memory controller 74 to share the internal read data bus 90.

The generation of "wait" signal 92 is performed at each memory controller level, taking into account the specific characteristics of the memory being driven and at the EBI level where it is necessary to collect all the memory controllers wait information and report a single signal. This is the function of 2_input OR gate 94.

FIG. 4 depicts prior art waveforms for a system including a read access to an external memory requiring one wait state and requiring roughly one clock cycle to release the data bus after the external memory has been de-selected.

The time required to completely release the data bus after the external memory de-selection is called "time data float" (TDF). The EBI asserts the wait signal 116 for three wait cycles 122, though D1 Data value 120 on the EBI data bus 112 is available after only one wait cycle. This is done to prevent any other transfer on EBI until the EBI data bus 112 is released, i.e. until time T2 126 on the system bus clock 102. The wait signal is asserted for the wait period 122 equal to the time data float period TDF. Therefore the next access to external memory cannot start before T2 126. According to the EBI address bus waveform 110 of FIG. 4, the next access starts at the time T3 128, whereas T3=T1+4. Thus, it takes a long time in the prior art to start the next access to the external memory following the initial read access.

SUMMARY OF THE INVENTION

To address the shortcomings of the art, the present invention provides an apparatus for improving a bandwidth for circuits having multiple memory controllers by generating a plurality of busy signals that are configured to indicate when the next external access to the data bus is allowed, thus improving the data throughput.

One aspect of the present invention is directed to an apparatus featuring a data bus, a memory controller, a first output signal circuit, and a second output signal circuit. The first output signal is configured to indicate when the memory controller releases the address bus for a next external access subsequent to a read access to the data bus by the memory controller, whereas the second output signal is configured to indicate when the memory controller releases the data bus for a next external access subsequent to a write access to the data bus by the memory controller.

In one embodiment, the apparatus of the present invention employs a first input signal circuit and a second input signal circuit. The first input signal is configured to indicate when the data bus is released by an external memory controller for a read access by the memory controller, whereas the second input signal is configured to indicate when the external bus is released by the external memory controller for a write access by the memory controller. The memory controller delays all external accesses to the data bus subsequent to an initial write access to the data bus. The memory controller anticipates a next external access to the address bus subsequent to an initial read access to the data bus by performing a next access command using the address bus.

Another aspect of the present invention is directed to an apparatus for improving bandwidth for circuits having a plurality of memory controllers. This architecture includes a first memory controller, a second memory controller, a first first_memory_controller_output signal circuit, a second first_memory_controller_output signal circuit, a first second_memory_controller_output signal circuit, and a second second_memory_controller_output signal circuit. In this embodiment, the first first_memory_controller_output signal is configured to indicate when the first memory controller releases the address bus for a next external access subsequent to a read access to the data bus by the first memory controller.

The second_first_memory_controller_output signal is configured to indicate when the first memory controller releases the data bus for a next external access subsequent to a write access to the data bus by the first memory controller. The first second_memory_controller_output signal is configured to indicate when the second memory controller releases the address bus for an external access subsequent to a read access to the data bus by the second memory controller. The second second_memory_controller_output signal is configured to indicate when the second memory controller releases the data bus for an external access subsequent to a write access to the data bus by the second memory controller.

BEST MODE FOR CARRYING OUT THE INVENTION

Figure 5:
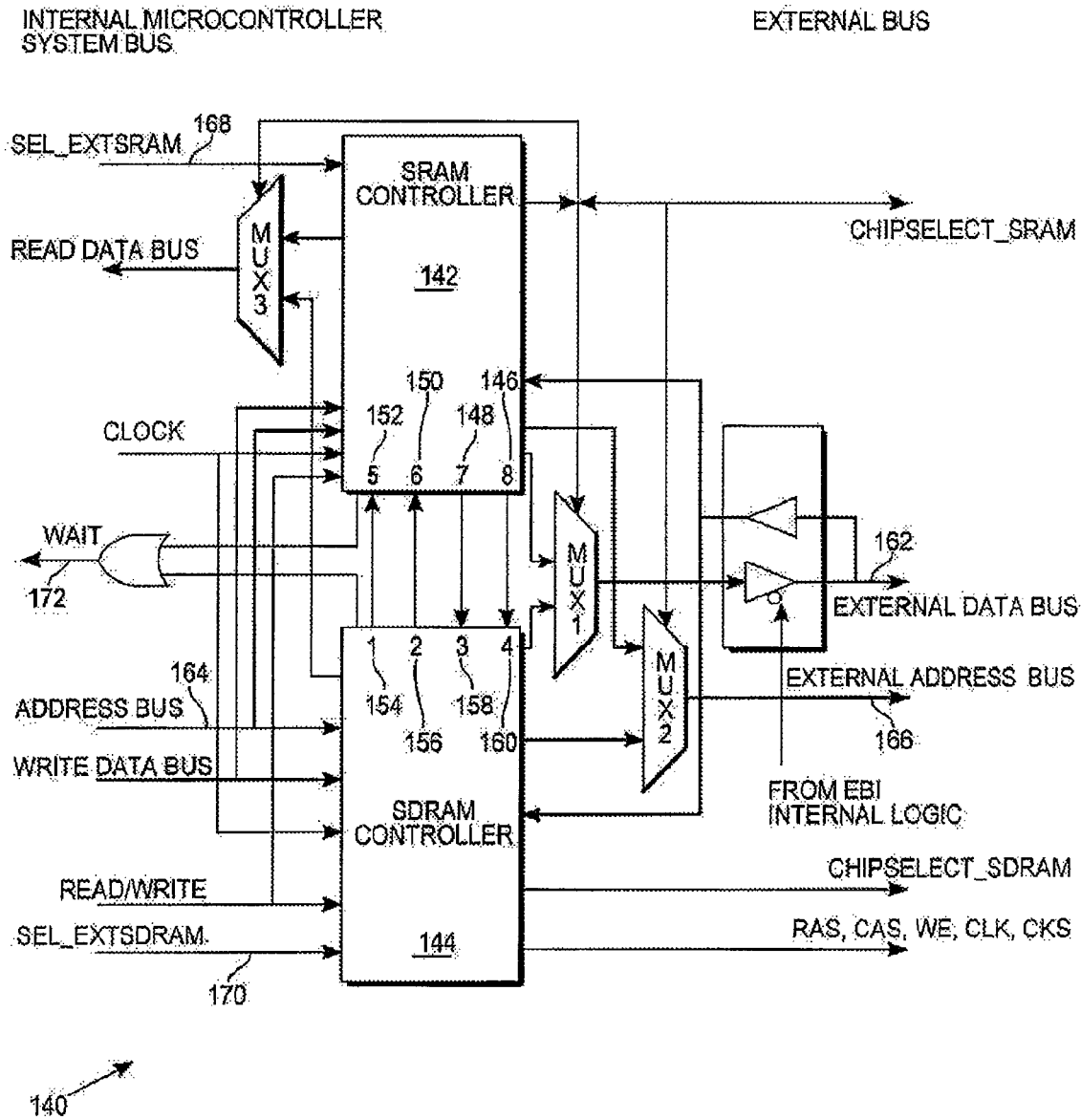
FIG. 5 depicts the apparatus of the present invention for improving bandwidth for circuits having a plurality of memory controllers and a plurality of busy signal circuits.

With reference to FIG. 5, the EBI apparatus 140 of the present invention for improving bandwidth for circuits 140 has a first (SRAM) memory controller 142 in parallel to a second (SDRAM) memory controller 144. A first first_memory_controller_output signal circuit 146 asserts a busy_read_out sram controller output signal 8. A second first_ memory_controller_output signal circuit 148 asserts a busy_ write_out sram controller output signal 7. A first second_ memory_controller_output signal circuit 156 asserts a busy_read_out sdram controller output signal 2. A second second_memory_controller_output signal circuit 154 asserts a busy_write_out sdram controller output signal 1.

A first first_memory_controller_input signal circuit 150 receives a busy_read_in_sram signal 6. A second first_memory_controller_input signal circuit 152 receives a busy_write_in_sram signal 5. A first second_memory_controller_input signal circuit 160 receives a busy_read_in_sdram signal 4, and a second second_memory_controller_input signal circuit 158 receives a busy_write_in_sdram signal 3.

The first memory controller 142, as well as the second memory controller 144, can be selected from various memory controllers including a static RAM (SRAM) memory controller; a flash memory controller; a burst flash memory controller; a synchronous dynamic RAM (SDRAM) memory controller; a double date rate synchronous dynamic RAM controller; and a reduced latency dynamic RAM memory controller.

The busy_read_in_sram signal 6 indicates when the external address bus 166 is released by the SDRAM memory controller 144 for a read access by the SRAM memory controller 142. The busy_write_in_sram signal 5 indicates when the external data bus 162 is released by the SDRAM memory controller 144 for a write access by the SRAM memory controller 142. The busy_read_in_sdram signal 4 indicates when the external address bus 166 is released by the SRAM memory controller 142 for a read access by the SDRAM memory controller 144. The busy_write_in_sdram signal 3 indicates when the external data bus 162 is released by the SRAM memory controller 142 for a write access by the SDRAM memory controller 144.

Referring still to FIG. 5, the busy_read_in sram signal 6 and the busy_write_in_sram signal 5 are internally combined with the selection signal sel_extsram 168 to allow the SRAM controller 142 access to the external bus 162. Similarly, the busy_read_in_sdram signal 4 and the busy_write_in_sdram signal 3 are internally combined with the selection signal sel_extsdram 170 to allow the SDRAM controller 144 access to the external bus 162.

Referring still to FIG. 5, the busy_read_out sram controller output signal 8 indicates when the SRAM memory controller 142 releases the external address bus 166 for a next external access subsequent to a read access to the data bus by the SRAM memory controller 142. The busy_write_out sram controller output signal 7 indicates when the SRAM memory controller 142 releases the external data bus 162 for a next external access subsequent to a write access to the data bus by the SRAM memory controller. The busy_read_out sdram controller output signal 2 indicates when the SDRAM memory controller 144 releases the external address bus 166 for an external access subsequent to a read access to the data bus by the SDRAM memory controller. The busy_write_out sdram controller output signal 1 is configured to indicate when the SDRAM memory controller 144 releases the external data bus 162 for an external access subsequent to a write access to the data bus by the SDRAM memory controller.

The "busy_read_out/busy_write_out" signals are asserted when some conditions are met. The timing condition to assert a "busy_read_out" signal is the time where a read access on an external memory ends (time data float also known as TDF). During this period the "busy_read_out" signal is asserted to indicate the memory controller 142 (or 144) which drives the next access to the address bus 166 that certain command (active or precharge command) can be performed because the external address bus 166 is not busy. The memory controller 142 (or 144) anticipates the next access to the address bus, but it will not perform the read command as long as "busy_read_out" signal is asserted because the residual data can be present on the EBI data bus. During a read access (whatever the next access is), the wait signal 172 is asserted to indicate the master (microprocessor, or direct memory access controller) (not shown) that the data is not ready. No other access can be anticipated in this situation.

On the other hand, the condition to assert the "busy_write_out" signal is a write access to the data bus 162 by the memory controller 142 (or 144) where the data bus 162 is driven by the microcontroller (not shown). The memory (for instance, SRAM, or SDRAM) may require several clock cycles so that the data could be correctly written.

Memory controller 142 (or 144) includes a store element (not shown) to hold the data until the write transfer is completed. If this is the case, there is no need to assert the "wait" signal. Instead, the master (microcontroller) should be informed that the current write access to the data bus needs several clock cycles to be completed. This is done by asserting the "busy_write_out" signal to prevent any other access on EBI. In this case it's not possible to anticipate a next access to the data bus 162 (whatever the next access is) because the external address bus 166 is busy by the write access. Therefore, the apparatus 140 of the present invention optimizes the EBI architecture efficiency for multiple memory type. Indeed, for a given clock frequency, an application software will run faster with the invention rather than without invention. The efficiency of the EBI architecture for multiple memory type of the present invention is illustrated in the discussion below.

Referring still to FIG. 5, the output circuits including the first first_memory controller_output signal circuit 146, the second first_memory_controller_output signal circuit 148, the first second_memory_controller_output signal circuit 156, and the second second_memory_controller_output signal circuit 154 are all electrically communicating with the input circuits including the first first_memory_controller_input signal circuit 150, the second first_memory_controller_input signal circuit 152, the first second_memory_controller_input signal circuit 160, and the second second_memory_controller_input signal circuit 158.

The "busy_write_out" signal 7 of memory controller 142 drives the "busy_write_in" signal 3 of memory controller 144. In another embodiment of the present invention, the "busy_write_out" output signal 1 of memory controller 144 drives the "busy_write_in" signal 5 of memory controller 142. In one more embodiment of the present invention, the "busy_read_out" signal 8 of memory controller 142 drives the "busy_read_in" signal 4 of memory controller 144. In one additional embodiment of the present invention, the "busy_read_out" output signal 2 of memory controller 144 drives the "busy_read_in" signal 6 of memory controller 142.

Example I

Figure 1:
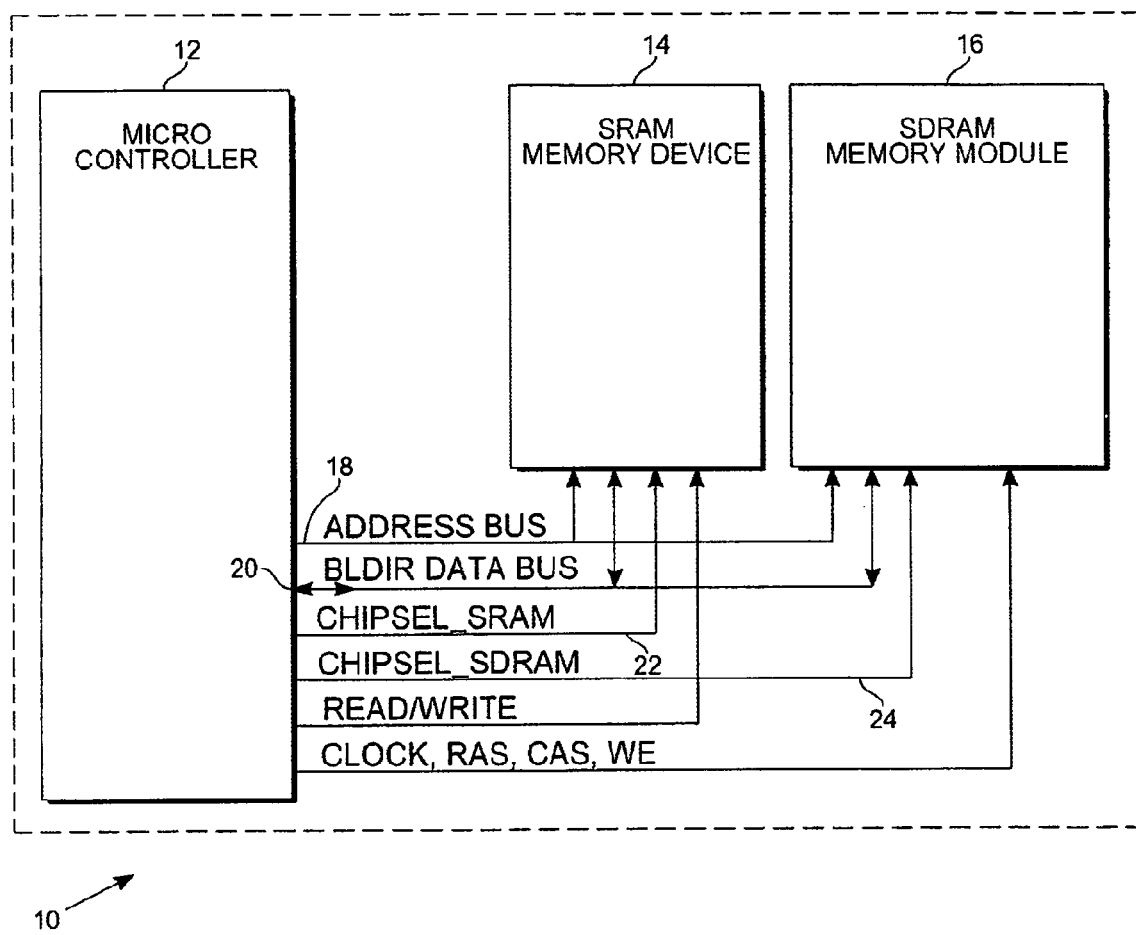
FIG. 1 depicts a prior art system architecture with a micro-controller connected to external memories, like a Static RAM (SRAM) memory and a synchronized dynamic RAM (SDRAM) memory.
Figure 2:
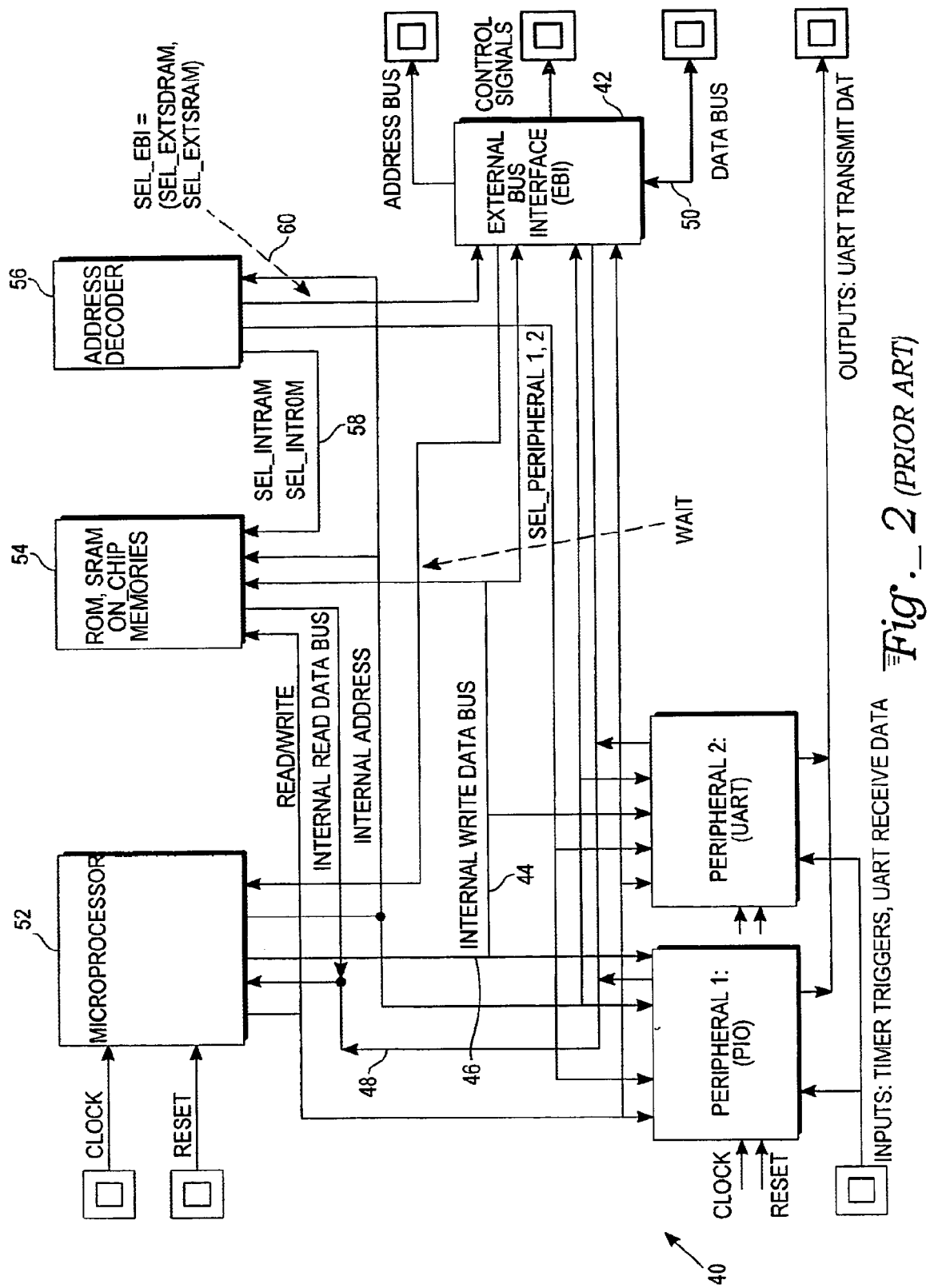
FIG. 2 illustrates a basic prior art micro-controller architecture.
Figure 3:
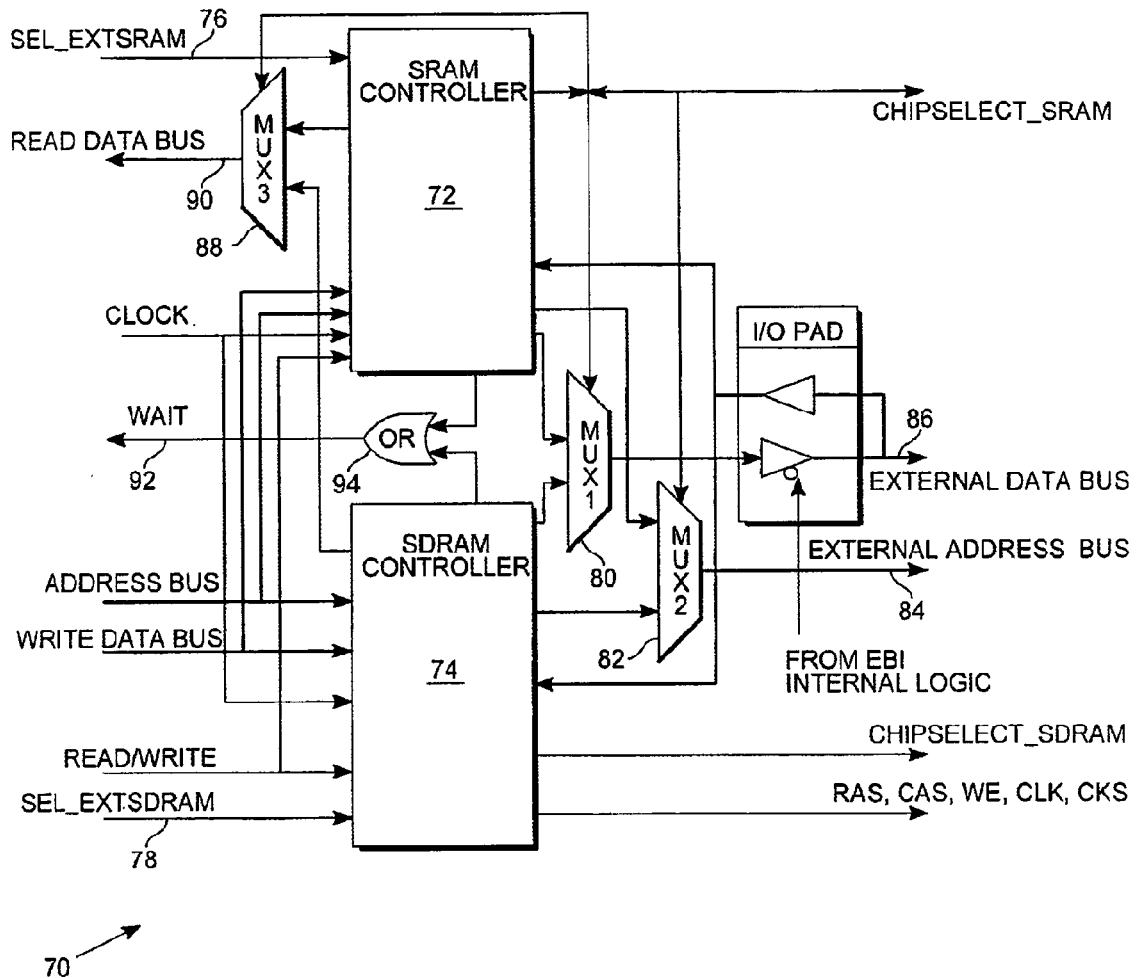
FIG. 3 shows the prior art architecture of the external bus interface (EBI) having several sub-modules, including a SRAM memory controller, and a SDRAM memory controller.
Figure 4:
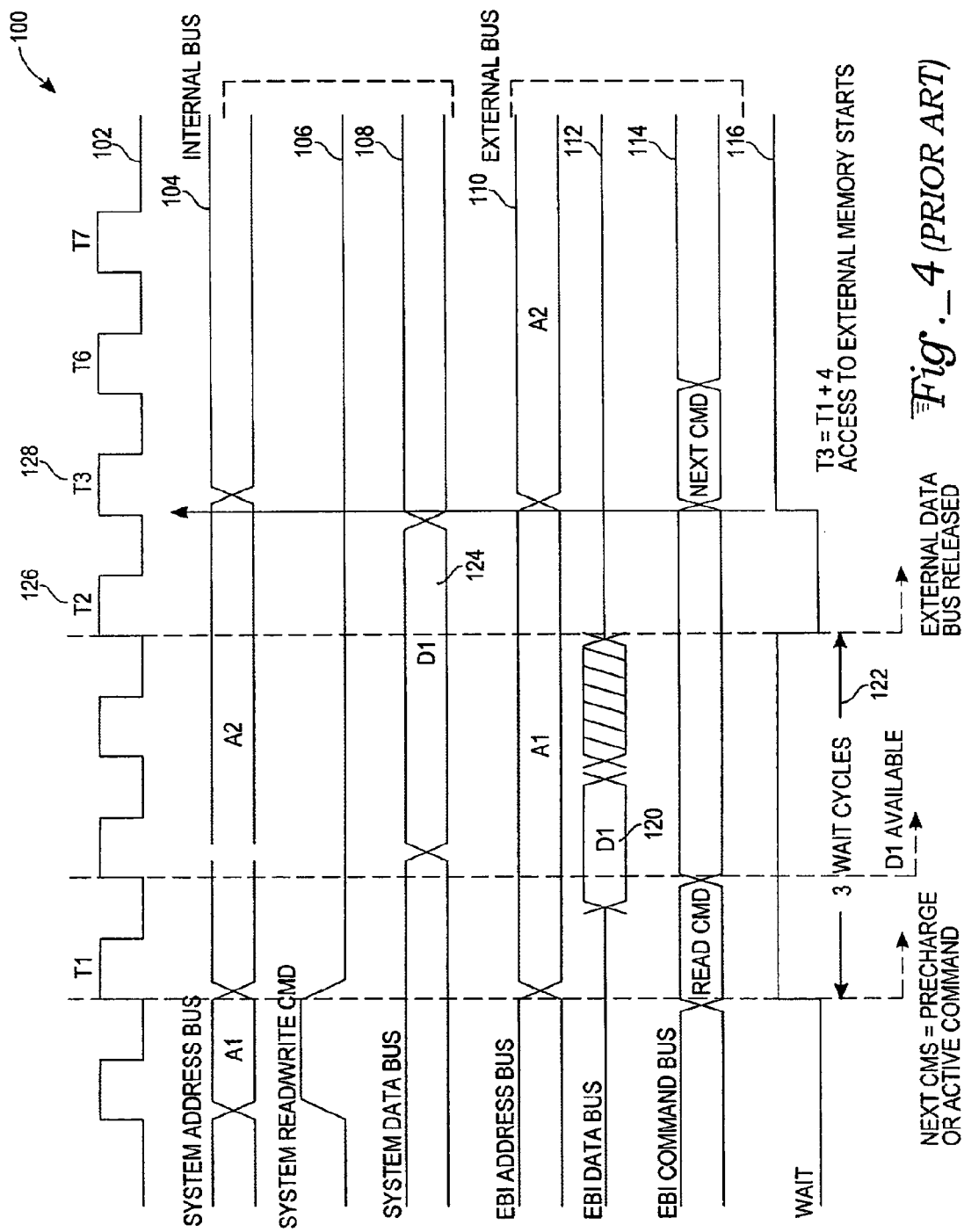
FIG. 4 illustrates prior art waveforms for a system including a read access to an external memory requiring one wait state and requiring roughly one clock cycle to release the data bus after the external memory has been de-selected.
Figure 6:
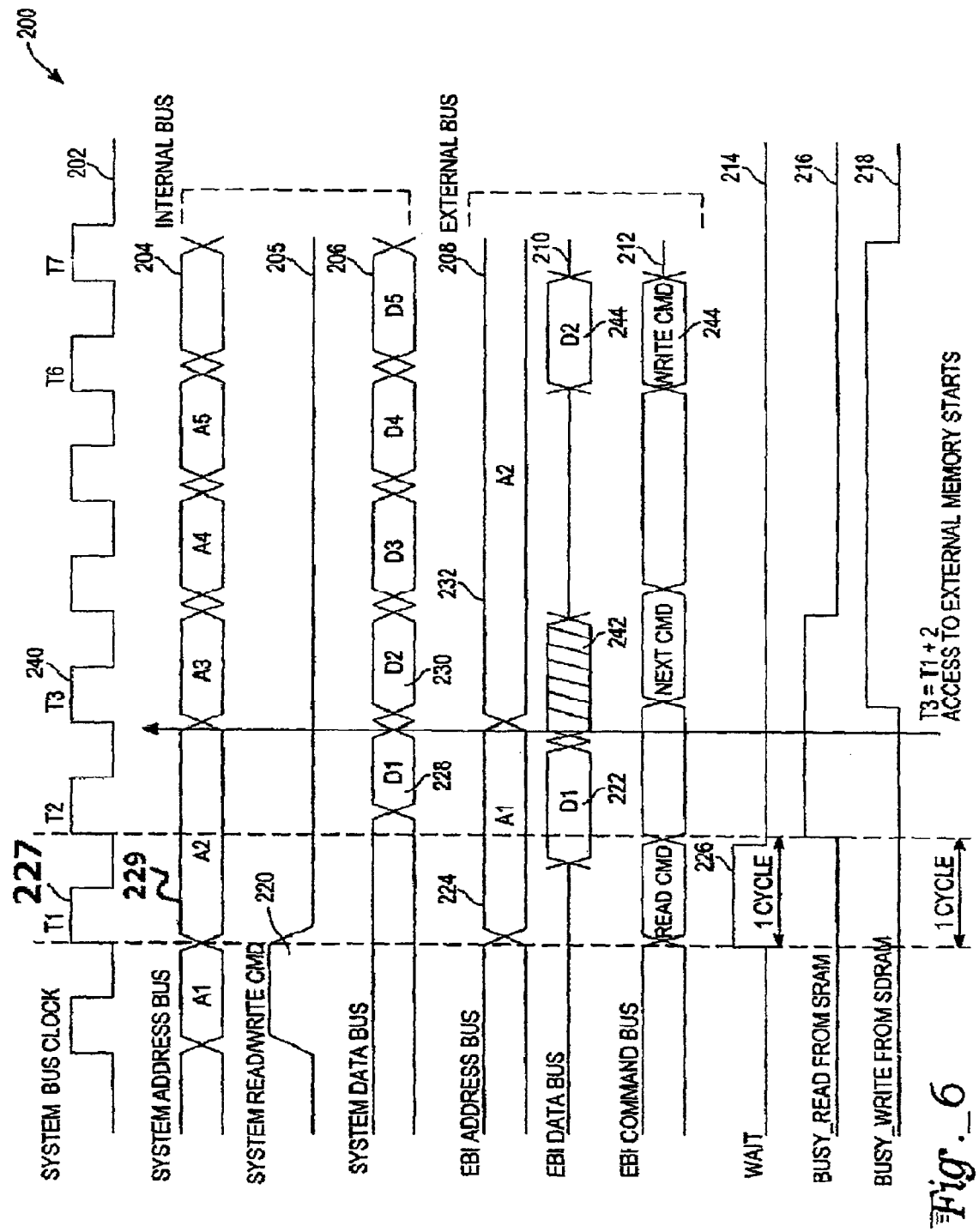
FIG. 6 illustrates timing diagrams for the apparatus of FIG. 5 having two clocks gain in throughput.

FIG. 6 illustrates a signal output drawing for the apparatus of FIG. 5 that has dual clock gain in throughput as compared with the throughput of the prior art apparatus of FIG. 4, when an external read access is followed by an external access, whereas the memory requires only one clock cycle of TOF. More specifically, the read transfer command 220 sent by the master on the internal system bus 205 starts the read transfer to an external memory followed by the external memory transfer to an another device access to the external bus. A read access is required on EBI (the read value D1 228 at the address location A1 224). The wait signal 226 from memory controller is asserted during the first clock period T1 227 (on a system bus clock 202), and de-asserted afterwards. Indeed, the master starts the new write access D2 230 at address location A2 232 which corresponds to the external memory without wait signals. Instead, the memory controller samples the internal address bus value A2 229 into internal storage elements and holds this value on the external address bus until the memory has completed the read of data bus (value D1 228) at time T3 240. This time is exactly the same as the time T3 of FIG. 4. What is different is the time when the next access can start, for instance the write access D2 230 at address location A2 232. Due to the absence of a wait signal and presence of busy read signal 216, the master can initiate the next transfer command using the control bus and the address bus then can perform the next transfer command to an external device at time T3 240 which is equal to (T1+2) clock cycles. On the other hand, in the prior art embodiment as depicted in FIG. 4, the time to start the new transfer command is T3=(T1+4) clock cycles. The gain is 2 clock cycles. The gain is higher if the wait signal used in the prior art apparatus to complete a single read is longer than 3 clock cycles.

Example II

Figure 7:
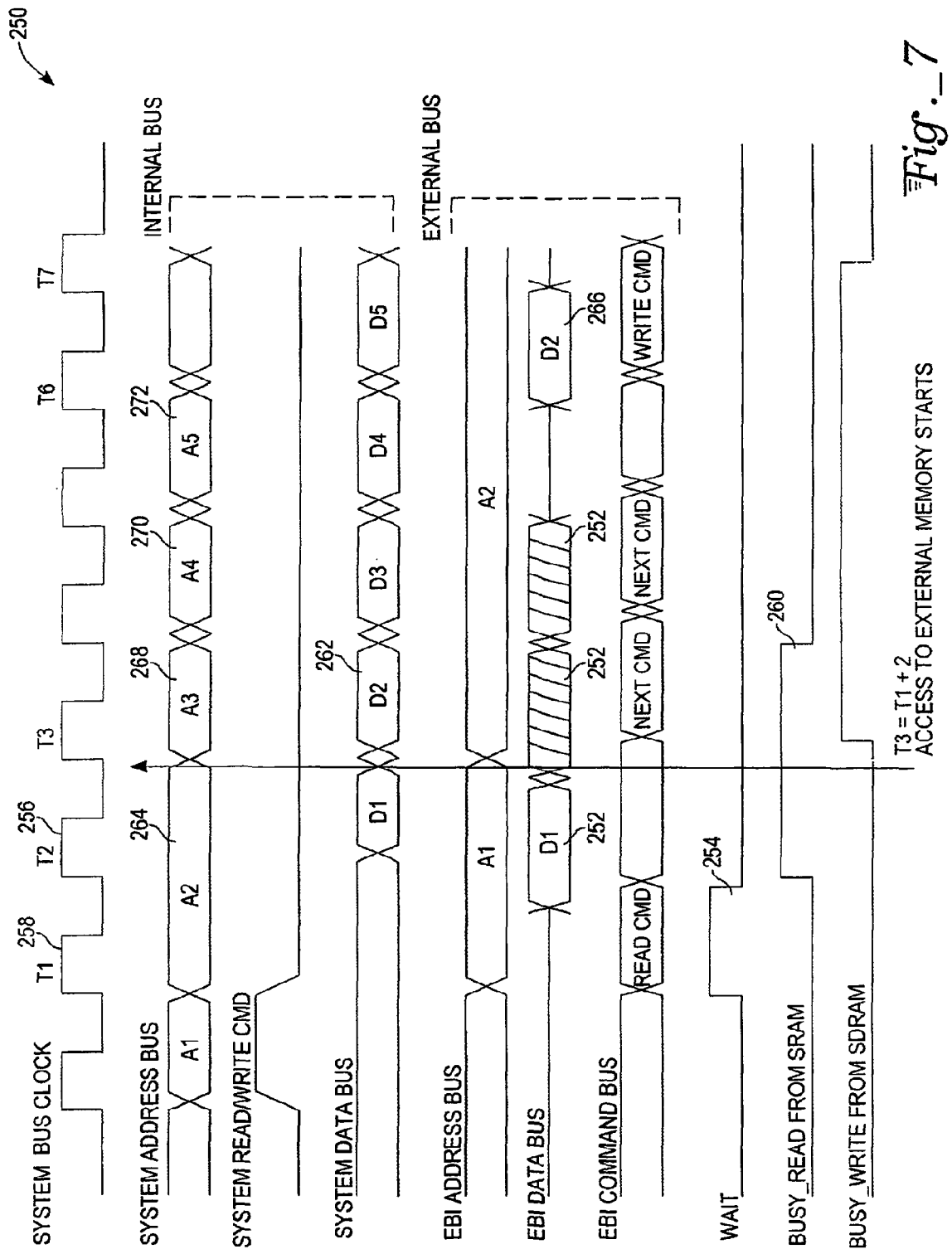
FIG. 7 illustrates timing diagrams with a gain in throughput for the apparatus of FIG. 5 when an external read access is followed by an external access.

FIG. 7 illustrates further signal output drawings for the apparatus of FIG. 5. In this example, the memory requires more than 2 clock cycles of TDF 252, whereas in the example shown in FIG. 6 the memory requires only one clock cycle of TDF 242. The time of data floating (TDF) is not part of the wait time 254. The gain is 2 clock cycle for the given example The gain is higher if the external memory requires more cycles to release the data bus after being de-selected. More specifically, on the first access the "wait" signal 254 is asserted to prevent the master from reading the data prematurely at cycle T2 256 after the first cycle T1 258. On the second cycle T2 256 the "wait" signal 254 is released to inform master that the data is ready on the internal bus. There is a direct throughput from external data bus to internal data bus. On the same T2 cycle the "busy_read" signal 260 is asserted to prevent a new access on the EBI to avoid data contention on the external data bus. If the next cycle is an external cycle, several commands can be sent during the time period when the busy_read signal 260 is asserted. This allows to use bus address. The A2 address 264 is processed and corresponding data (D2) 266 is set on the external data bus when busy_read is de-asserted to avoid contention on the bus, and when all additional conditions are met (for example, the asynchronous timing of SDRAM). If the next cycles are the internal accesses, like the internal accesses to A3 268, to A4 270, and to A5 272 addresses which do not use the external data bus, the risk of data contention is low and the transfer is not blocked.

Example III

Figure 8:
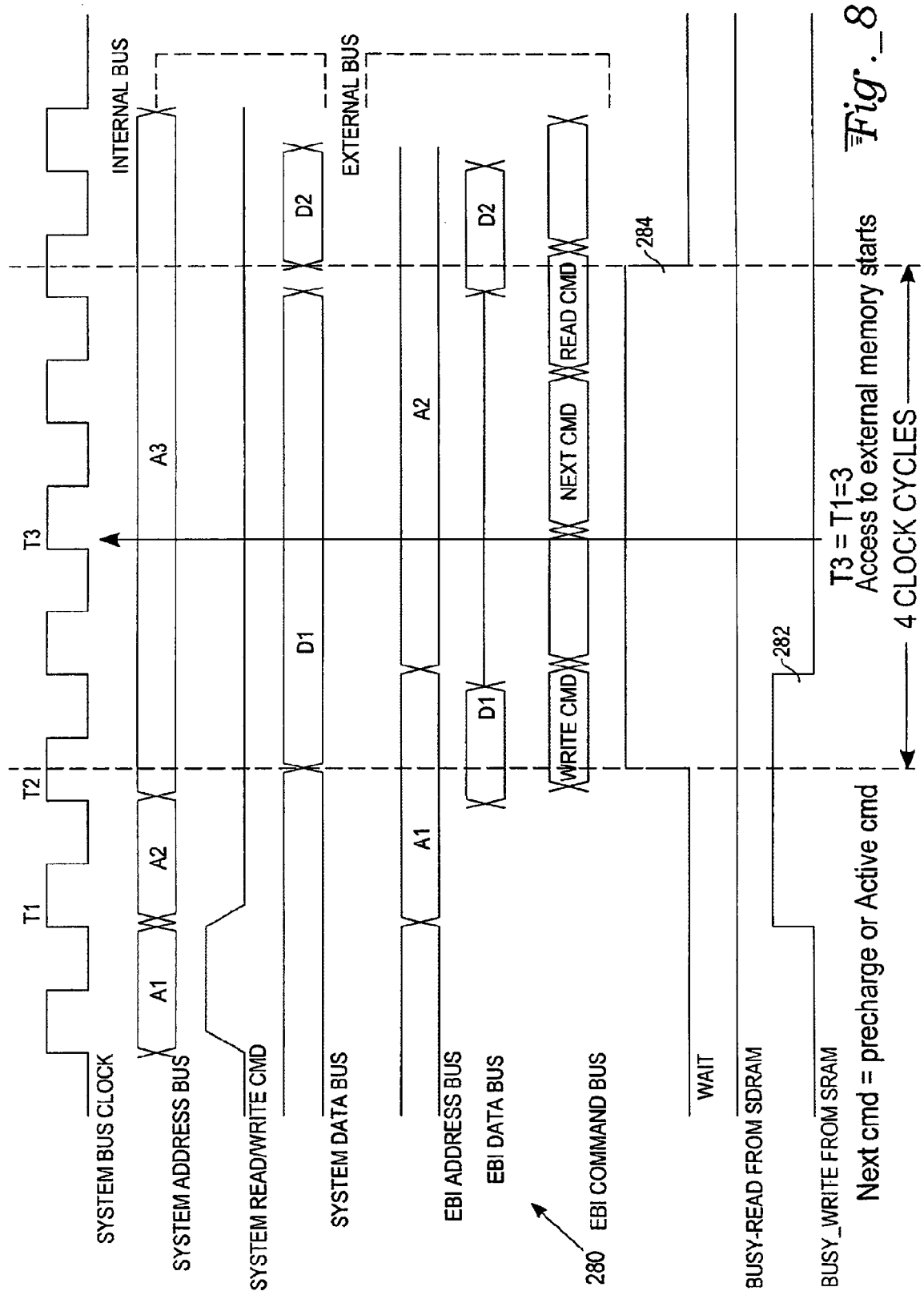
FIG. 8 illustrates timing diagrams with a gain in the throughput of the apparatus of FIG. 5 when an external write access is followed by an external access.

FIG. 8 illustrates further signal output drawings of the apparatus of FIG. 5. The memory may require several clock cycles to be correctly written, for instance two clock periods. If the memory controller includes a store element to hold the data until the write transfer is completed, there is no need to assert the wait signal 284. Instead, there is a need to inform the system (master) that the current write access needs several clock cycles to be completed. This is done by asserting a busy_write signal 282 to prevent any other access on EBI. If this is the case, it is not possible to anticipate the next access, no matter what the next access is, because the external address bus is busy by the write access. In this embodiment, the gain is dependent on the number of clock cycles required for a write command to be completed.

Referring still to FIG. 5, the following output circuits: the first first_memory_controller_output signal circuit 146, the second first_memory_controller_output signal circuit 148, the first second_memory_controller_output signal circuit 156, and the second second_memory_controller_output signal circuit 154 are all electrically disconnected from the following input circuits: the first first_memory_controller_input signal circuit 150, the second first_memory_controller_input signal circuit 152, the first second_memory_controller input signal circuit 160, and the second second_memory_controller_input signal circuit 158. In this embodiment, the simplified architecture features a data bus 162, a single memory controller 142, a first output signal circuit 146, a second output signal circuit 148, a first input signal circuit 150, and a second input signal circuit 152. The first output signal 8 indicates when the memory controller 142 releases the address bus 166 for a next external access subsequent to a read access to the data bus by the memory controller 142, whereas the second output signal 7 indicates when the memory controller 142 releases the data bus 162 for a next external access subsequent to a write access to the data bus 162 by the memory controller 142. The first input signal 6 indicates when the address bus 166 is released by an external memory controller for a read access by the memory controller 142, whereas the second input signal 5 indicates when the external bus is released by the external memory controller for a write access by the memory controller 142.

The method for improving bandwidth for circuits having a plurality of memory controllers employs the following steps: (A) asserting a first first_memory_controller_output signal to indicate when a first memory controller releases an address bus for a next external access subsequent to a read access to the data bus by the first memory controller; (B) asserting a second first_memory_controller_output signal to indicate when the first memory controller releases the data bus for a next external access subsequent to a write access to the data bus by the first memory controller; (C) asserting a first second_memory_controller_output signal to indicate when a second memory controller releases the address bus for an external access subsequent to a read access to the data bus by the second memory controller; and (D) asserting a second second_memory_controller_output signal to indicate when the second memory controller releases the data bus for an external access subsequent to a write access to the data bus by the second memory controller.

In one embodiment of the present invention, the step (A) of asserting the first first_memory_controller_output signal further includes the step of: (A1) asserting a first_busy_read_out signal by using the address bus to anticipate a next external access to the data bus subsequent to an initial read access to the external data bus by the first memory controller.

The step (B) of asserting the second first_memory_controller_output signal further includes the step of: (B1) asserting a first_busy_write_out signal to delay all external accesses to the external data bus subsequent to an initial write access to the external data bus by the first memory controller. The step (C) of asserting the first second_memory_controller_output signal further includes the step of: (C1) asserting a second_busy_read_out signal by using the address bus to anticipate a next external access to the data bus subsequent to an initial read access to the external data bus by the second memory controller. The step (D) of asserting the second second_memory_controller_output signal further includes the step of: (D1) asserting a second_busy_write_out signal to delay all external accesses to the external data bus subsequent to an initial write access to the external data bus by the second memory controller.

Further steps can include the following: (E) asserting a first first_memory_controller_input signal to indicate when the external address bus is released for a read access by the first memory controller; (F) asserting a second first_memory_controller_input signal to indicate when the external data bus is released for a write access by the first memory controller; (G) asserting a first second_memory_controller_input signal to indicate when the external address bus is released for a read access by the second memory controller; and (H) asserting a second second_memory_controller_input signal to indicate when the external data bus is released for a write access by the second memory controller.

What is claimed is:

1. A method comprising:
    applying a first busy read out signal from a first output of a first memory controller directly to a first input of a second memory controller to indicate to the second memory controller when the first memory controller releases an external address bus subsequent to an access to the external address bus and an external data bus by the first memory controller; and
    applying a first busy write out signal from a second output of the first memory controller directly to a second input of the second memory controller to indicate to the second memory controller when the first memory controller releases the external data bus subsequent to an access to the external address bus and the external data bus by the first memory controller; and
    applying a second busy read out signal from a third output of the second memory controller directly to a third input of the first memory controller to indicate to the first memory controller when the second memory controller releases the external address bus subsequent to an access to the external address bus and the external data bus by the second memory controller; and
    applying a second busy write out signal from a fourth output of the second memory controller directly to a fourth input of the first memory controller to indicate to the first memory controller when the second memory controller releases the external data bus subsequent to an access to the external address bus and the external data bus by the second memory controller.

2. The method of claim 1, further comprising performing a command for a next access to the external data bus and the external address bus when a read access to an external memory on the external data bus and the external address bus reaches a period where the external data bus is floating.

3. The method of claim 1, further comprising performing a command for a next access on the external data bus and the external address bus when a write access to an external memory on the external data bus and the external address bus reaches a period where the external data bus and the external address bus are free.

4. The method of claim 1, further comprising asserting the first busy read out signal of the first memory controller or the second busy read out signal of the second memory controller after ending a read access on an external memory on the external data bus and the external address bus to indicate that a command can be performed on the external address bus.

5. The method of claim 1, further comprising asserting the first busy write out signal of the first memory controller or the second busy write out signal of the second memory controller during a write access to the external data bus and the external address bus to prevent another access on the external data bus and the external address bus.

6. The method of claim 1, further comprising asserting a wait signal during a read access on the external data bus and the external address bus to indicate to a master that data is not ready.

7. The method of claim 1, further comprising:
    transmitting data to a first memory circuit through the first memory controller and the external data bus and the external address bus; and
    transmitting data to a second memory circuit through the second memory controller and the external data bus and the external address bus.

8. The method of claim 1, wherein:
    the first memory controller is a first type of memory controller; and
    the second memory controller is a second type of memory controller.

9. A system comprising:
    a first memory controller in electrical communication with an external address bus and an external data bus, the first memory controller configured to control a first memory circuit;
    a second memory controller in electrical communication with the external address bus and the external data bus, the second memory controller configured to control a second memory circuit;
    a first circuit in the first memory controller and coupled to the second memory controller to signal when the first memory controller releases the external address bus subsequent to an access to the external address bus and the external data bus by the first memory controller, wherein the first circuit comprises a first output signal circuit in the first memory controller directly coupled to a first input signal circuit in the second memory controller; and
    a second circuit in the first memory controller and coupled to the second memory controller to signal when the first memory controller releases the external data bus subsequent to an access to the external address bus and the external data bus by the first memory controller, wherein the second circuit comprises a second output signal circuit in the first memory controller directly coupled to a second input signal circuit in the second memory controller; and
    a third circuit in the second memory controller and coupled to the first memory controller to signal when the second memory controller releases the external address bus subsequent to an access to the external address bus and the external data bus by the second memory controller, wherein the third circuit comprises a third output signal circuit in the second memory controller directly coupled to a third input signal circuit in the first memory controller; and a fourth circuit in the second memory controller and coupled to the first memory controller to signal when the second memory controller releases the external data bus subsequent to an access to the external address bus and the external data bus by the second memory controller, wherein the fourth circuit comprises a fourth output signal circuit in the second memory controller directly coupled to a fourth input signal circuit in the first memory controller.

10. The system of claim 9 wherein:

the first memory controller further comprises a memory controller selected from the group consisting of a static random access memory (RAM) controller, a flash memory controller, a burst flash memory controller, a single data rate synchronous dynamic RAM (SDR SDRAM) controller, a double data rate synchronous dynamic RAM (DDR SDRAM) controller, a pseudo-static RAM (PSRAM) controller, a CellularRam controller, and a reduced latency dynamic RAM (RLDRAM) controller; and the second memory controller further comprises a memory controller selected from the group consisting of a static random access memory (RAM) controller, a flash memory controller, a burst flash memory controller, a single data rate synchronous dynamic RAM (SDR SDRAM) controller, a double data rate synchronous dynamic RAM (DDR SDRAM) controller, a pseudo-static RAM (PSRAM) controller, a CellularRam controller, and a reduced latency dynamic RAM (RLDRAM) controller.

11. The system of claim 9 wherein:

the first memory controller is a static RAM memory controller; and the second memory controller is a SDRAM memory controller.

12. The system of claim 9, further comprising an additional circuit coupled between the first memory controller and the second memory controller to generate a wait signal in response to signals from the first memory controller and the second memory controller.

* * * * *